US010513346B2

(12) United States Patent
Ouellette

(10) Patent No.: US 10,513,346 B2
(45) Date of Patent: Dec. 24, 2019

(54) INDICATING SYSTEMS, DEVICES AND METHODS FOR HIGH-LIFT FLIGHT CONTROL SURFACES OF AIRCRAFT

(71) Applicant: BOMBARDIER INC., Dorval (CA)

(72) Inventor: Benoit Ouellette, Verdun (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 15/735,307

(22) PCT Filed: Jun. 7, 2016

(86) PCT No.: PCT/IB2016/053331
§ 371 (c)(1),
(2) Date: Dec. 11, 2017

(87) PCT Pub. No.: WO2016/199016
PCT Pub. Date: Dec. 15, 2016

(65) Prior Publication Data
US 2018/0155054 A1    Jun. 7, 2018

Related U.S. Application Data

(60) Provisional application No. 62/174,739, filed on Jun. 12, 2015.

(51) Int. Cl.
*B64D 45/00*        (2006.01)
*B64C 3/44*         (2006.01)
(Continued)

(52) U.S. Cl.
CPC ............ *B64D 45/0005* (2013.01); *B64C 3/44* (2013.01); *B64C 3/50* (2013.01); *B64C 9/16* (2013.01); *B64C 9/22* (2013.01); *B64D 43/00* (2013.01)

(58) Field of Classification Search
CPC ...... B64D 45/0005; B64D 43/00; B64C 3/44; B64C 3/50; B64C 9/16; B64C 9/22
(Continued)

(56) References Cited

U.S. PATENT DOCUMENTS 4,663,627 A * 5/1987 Dennis .................... B64C 13/00
                                                     244/1 R
8,027,758 B2 * 9/2011 Ferro ...................... G01C 23/00
                                                      244/183
(Continued)

FOREIGN PATENT DOCUMENTS

EP     2400273 A2    12/2011
GB     2500390 A      9/2013
(Continued)

OTHER PUBLICATIONS

PCT international Search Report and Written Opinion dated Aug. 4, 2016 re: International Application No. PCT/IB2016/053331.
(Continued)

*Primary Examiner* — Yazan A Soofi
(74) *Attorney, Agent, or Firm* — Norton Rose Fulbright Canada LLP

(57) ABSTRACT

Systems, devices and methods a for use with one or more high-lift flight control surfaces (24) of aircraft are disclosed. One exemplary method comprises receiving data representative of a commanded configuration (48) for a high-lift flight control surface (24); and on a display device (14) of the aircraft, showing an indicator (30) indicating the commanded configuration and a corresponding commanded position (50) for the high-lift flight control surface (24). The indicator (30) graphically indicates a correlation between the commanded configuration (48) and the corresponding commanded position (50) for the high-lift flight control surface (24).

33 Claims, 10 Drawing Sheets

(51) Int. Cl.
*B64C 3/50* (2006.01)
*B64C 9/16* (2006.01)
*B64C 9/22* (2006.01)
*B64D 43/00* (2006.01)

(58) Field of Classification Search
USPC .......................................................... 701/14
See application file for complete search history.

(56) References Cited

U.S. PATENT DOCUMENTS

| | | | | |
|---|---|---|---|---|
| 8,403,256 | B1* | 3/2013 | Gregg, III | B64C 1/061 |
| | | | | 244/119 |
| 8,755,956 | B2* | 6/2014 | Goupil | G01M 17/00 |
| | | | | 244/75.1 |
| 8,818,573 | B2* | 8/2014 | Goupil | B64D 45/0005 |
| | | | | 701/3 |
| 8,878,700 | B2* | 11/2014 | Pennell | B64D 45/00 |
| | | | | 340/973 |
| 2011/0038727 | A1* | 2/2011 | Vos | B64C 3/46 |
| | | | | 416/1 |
| 2011/0118908 | A1* | 5/2011 | Boorman | G08G 5/0021 |
| | | | | 701/14 |
| 2016/0347451 | A1* | 12/2016 | Shepshelovich | B64C 13/16 |
| 2016/0355253 | A1* | 12/2016 | Nfonguem | F16D 37/008 |
| 2017/0057619 | A1* | 3/2017 | Wilson | B64C 13/40 |

FOREIGN PATENT DOCUMENTS

| | | | | |
|---|---|---|---|---|
| WO | 2014135945 | A1 | 9/2014 | |
| WO | 2015138327 | A1 | 9/2015 | |
| WO | WO-2015138327 | A1 * | 9/2015 | ........... G08G 5/0052 |

OTHER PUBLICATIONS

European Patent Office, Communication pursuant to Article 94(3) EPC dated Sep. 17, 2018 re: application No. 16 727 850.6-1010.

* cited by examiner

INDICATING SYSTEMS, DEVICES AND METHODS FOR HIGH-LIFT FLIGHT CONTROL SURFACES OF AIRCRAFT

CROSS-REFERENCE TO RELATED APPLICATION(S)

The present application is a national phase application under 35 U.S.C. 371 of International Patent Application No. PCT/IB2016/053331 filed on Jun. 7, 2016, which claims priority from U.S. Provisional Patent Application No. 62/174,739 filed on Jun. 12, 2015, the entire content of which is incorporated herein by reference.

TECHNICAL FIELD

The disclosure relates generally to aircraft operation, and more particularly to systems, devices and methods for assisting with the operation of high-lift flight control surfaces of an aircraft.

BACKGROUND OF THE ART

High-lift flight control surfaces are typically used to increase the lift of an aircraft wing during the take-off and/or landing phases. Such high-lift flight control surfaces typically comprise one or more trailing edge devices also known as flaps and can sometimes also comprise one or more leading edge devices also known as slats on larger aircraft. Different configurations of flap and slat deployment is typically achieved via a lever in the flight deck that can be positioned at discrete positions corresponding to specific commanded configurations for the flaps and slats. Since both flaps and slats typically move to different positions (measured in degrees) for a commanded configuration, it has become a common practice to identify those configurations through a discrete number (e.g., 0, 1, 2, 3 and 4) corresponding to specific lever positions. On some aircraft, the same number can correspond to different flaps and/or slats positions depending on whether the aircraft is about to take-off or about to land. Even though the lever has discrete positions, the high-lift flight control surface(s) move to attain corresponding commanded position(s) typically measured in degrees.

Existing methods for presenting information to the flight crew about the operation of high-lift flight control surfaces require a significant amount of the flight crew's attention during phases of high workload and can potentially lead to misinterpretation of the information. Improvement is desirable.

SUMMARY

In one aspect, the disclosure describes an indicating system for one or more high-lift flight control surfaces of an aircraft. The system comprises:
a data processor; and
machine-readable memory storing instructions executable by the processor and configured to cause the processor to:
using data representative of a commanded configuration for a high-lift flight control surface and data representative of a corresponding commanded position for the high-lift flight control surface, generate an output for causing a display device of the aircraft to show an indicator indicating the commanded configuration and the corresponding commanded position for the high-lift flight control surface, the indicator graphically indicating a correlation between the commanded configuration and the corresponding commanded position for the high-lift flight control surface.

The commanded configuration may correspond to a high-lift configuration number.

The commanded configuration may correspond to a position of a lever.

The instructions may be configured to cause the processor to, using data representative of an actual position of the high-lift flight control surface, generate the output for causing the indicator to indicate the actual position of the high-lift flight control surface.

The commanded position may be indicated using an analog scale.

The instructions may be configured to cause the processor to, using data representative of an actual position of the high-lift flight control surface, generate the output for causing the indicator to indicate the actual position of the high-lift flight control surface.

The actual position may be indicated using the analog scale.

The actual position may be indicated using a progress bar along the analog scale.

The commanded position may be indicated using a marker along the analog scale.

The indicator may comprise a graphical connector between the indicated commanded configuration and the indicated commanded position for the high-lift flight control surface to indicate the correlation between the commanded configuration and the commanded position for the high-lift flight control surface.

The graphical connector may comprise: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

The progress bar may comprise: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

The marker may comprise: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

The instructions may be configured to cause the processor to: using data representative of a corresponding commanded position for another high-lift flight control surface, generate the output for causing the indicator to indicate the corresponding commanded position for the other high-lift flight control surface, the indicator graphically indicating another correlation between the commanded configuration and the corresponding commanded position for the other high-lift flight control surface.

The instructions may be configured to cause the processor to, using data representative of an actual position of the other high-lift flight control surface, generate the output for causing the indicator to indicate the actual position of the other high-lift flight control surface.

The indicated commanded configuration may comprise a textual element representing the commanded configuration. The textual element may have a variable position that is dependent on the commanded configuration.

In another aspect, the disclosure describes an aircraft comprising a system as described herein.

In another aspect, the disclosure describes a display device for one or more high-lift flight control surfaces of an aircraft. The display device comprises:

a display area; and an indicator shown in the display area, the indicator indicating a commanded configuration for a high-lift flight control surface and a corresponding commanded position for the high-lift flight control surface, the indicator graphically indicating a correlation between the commanded configuration and the corresponding commanded position for the high-lift flight control surface.

The commanded configuration may correspond to a high-lift configuration number.

The commanded configuration may correspond to a position of a lever.

The indicator may indicate the actual position of the high-lift flight control surface.

The commanded position may be indicated using an analog scale.

The indicator may indicate the actual position of the high-lift flight control surface.

The actual position may be indicated using the analog scale.

The actual position may be indicated using a progress bar along the analog scale.

The commanded position may be indicated using a marker along the analog scale.

The indicator may comprise a graphical connector between the indicated commanded configuration and the indicated commanded position for the high-lift flight control surface to indicate the correlation between the commanded configuration and the commanded position for the high-lift flight control surface.

The graphical connector may comprise: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

The progress bar may comprise: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

The marker may comprise: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

The indicator may indicate a corresponding commanded position for another high-lift flight control surface. The indicator may graphically indicate a correlation between the commanded configuration and the corresponding commanded position for the other high-lift flight control surface.

The indicator may indicate an actual position of the other high-lift flight control surface.

The indicated commanded configuration may comprise a textual element representing the commanded configuration. The textual element may have a variable position that is dependent on the commanded configuration.

In another aspect, the disclosure describes an aircraft comprising a display device as described herein.

In another aspect, the disclosure describes a method for use with one or more high-lift flight control surfaces of an aircraft. The method comprises:

receiving data representative of a commanded configuration for a high-lift flight control surface; and on a display device of the aircraft, showing an indicator indicating the commanded configuration and a corresponding commanded position for the high-lift flight control surface, the indicator graphically indicating a correlation between the commanded configuration and the corresponding commanded position for the high-lift flight control surface.

The commanded configuration may correspond to a high-lift configuration number.

The commanded configuration may correspond to a position of a lever.

The method may comprise receiving data representative of an actual position of the high-lift flight control surface and causing the indicator to indicate the actual position of the high-lift flight control surface.

The method may comprise indicating the commanded position using an analog scale.

The method may comprise receiving data representative of an actual position of the high-lift flight control surface and causing the indicator to indicate the actual position of the high-lift flight control surface.

The method may comprise indicating the actual position using the analog scale.

The method may comprise indicating the actual position using a progress bar along the analog scale.

The method may comprise indicating the commanded position using a marker along the analog scale.

The indicator may comprise a graphical connector between the indicated commanded configuration and the indicated commanded position for the high-lift flight control surface to indicate the correlation between the commanded configuration and the commanded position for the high-lift flight control surface.

The graphical connector may comprise: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

The progress bar may comprise: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

The marker may comprise: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

The method may comprise receiving data representative of a corresponding commanded position for another high-lift flight control surface and causing the indicator to indicate the corresponding commanded position for the other high-lift flight control surface where the indicator graphically indicates a correlation between the commanded configuration and the corresponding commanded position for the other high-lift flight control surface.

The method may comprise receiving data representative of an actual position of the other high-lift flight control surface and causing the indicator to indicate the actual position of the other high-lift flight control surface.

The indicated commanded configuration may comprise a textual element representing the commanded configuration. The textual element may have a variable position that is dependent on the commanded configuration.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure describes systems, display devices, methods and computer program products useful for assisting a flight crew with the operation of one or more high-lift flight control surfaces of an aircraft. In various aspects, an indicator is presented to the flight crew to simultaneously indicate a commanded configuration (e.g., lever position) and one or more corresponding commanded positions (e.g., degrees) for one or more high-lift flight control surfaces respectively. In some embodiments, the indicator graphically indicates a correlation (e.g., graphical link) between the commanded configuration and the corresponding commanded position(s) for the high-lift flight control surface(s). In some embodiments, the indicator also simultaneously indicates the actual position(s) of the high-lift flight control surface(s). In some embodiments, the indicator graphically indicates the presence of a system degradation (e.g., failure) affecting the operation of one or more of the high-lift flight control surfaces.

The indicator provides relevant information about the operation of one or more high-lift flight control surfaces to the flight crew in a clear and integrated manner that is also intuitive and relatively easy to interpret by the flight crew. This may contribute toward reducing pilot workload during critical phases of flight such as take-off and landing.

Aspects of various embodiments are described through reference to the drawings.

Figure 1:
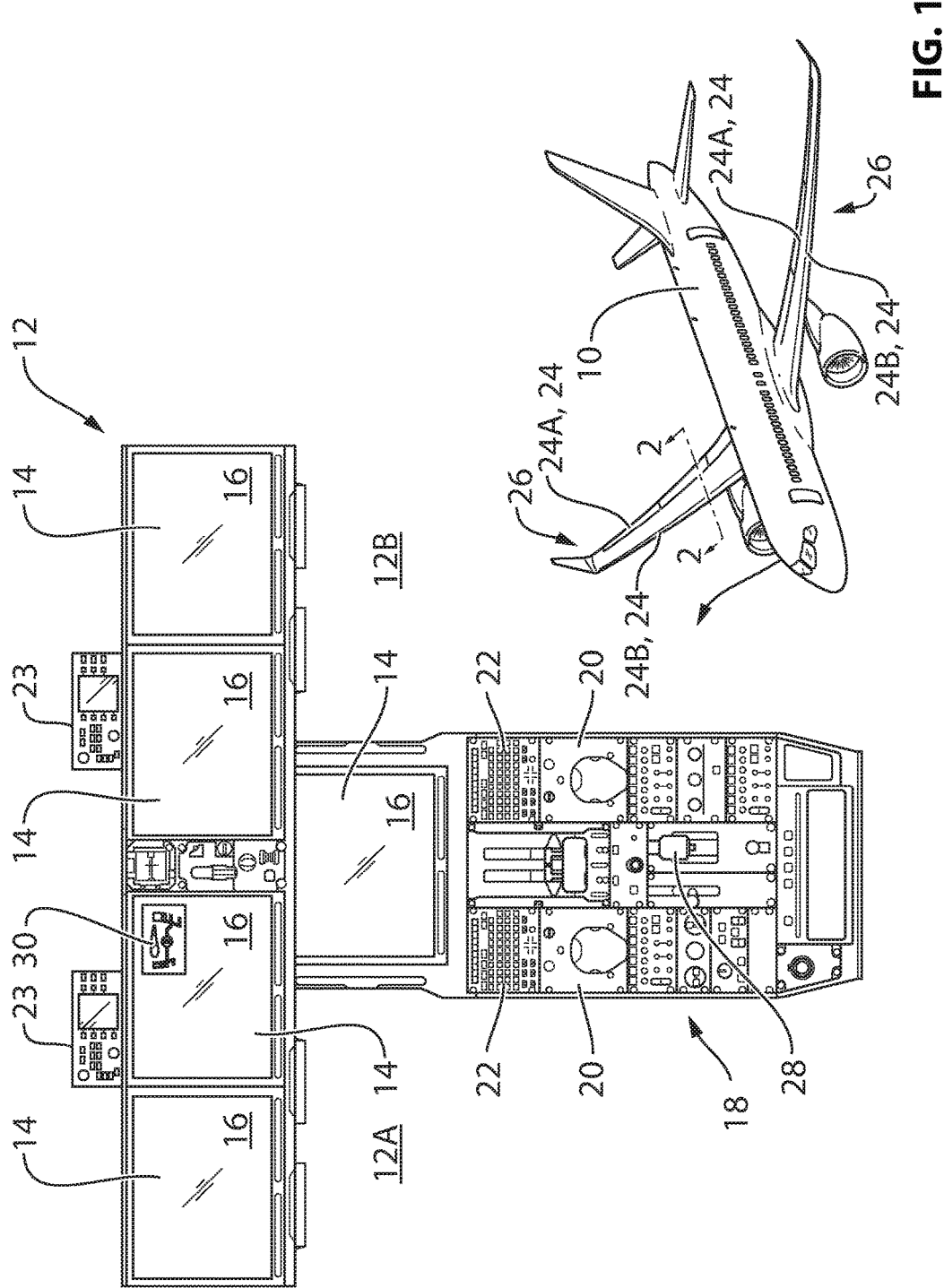
FIG. 1 shows an exemplary aircraft flight deck and a corresponding exemplary aircraft comprising the flight deck.

FIG. 1 shows an exemplary aircraft 10 and a partial schematic representation of flight deck 12 which may be part of aircraft 10. Aircraft 10 may be a corporate, private, commercial or any other type of aircraft. For example, aircraft 10 may be a fixed-wing aircraft. In some embodiments, aircraft 10 may be a narrow-body, twin engine jet airliner. Flight deck 12 may comprise additional or fewer elements than those shown and described herein. Flight deck 12 may comprise left portion 12A intended to be used by a pilot (sometimes referred as "captain") of aircraft 10 and right portion 12B intended to be used by a co-pilot (sometimes referred as "first officer") of aircraft 10. Left portion 12A and right portion 12B may comprise functionally identical components so that at least some operational redundancy may be provided between left portion 12A and right portion 12B of flight deck 12.

Flight deck 12 may comprise one or more display devices 14 providing respective display areas 16. In the particular configuration of flight deck 12 shown, left portion 12A and right portion 12B may each comprise two display devices 14 and an additional display device 14 may be provided in pedestal region 18 of flight deck 12. Display device 14 provided in pedestal region 18 may be shared between the captain and the first officer during normal operation of aircraft 10. Display devices 14 may include one or more cathode-ray tubes (CRTs), liquid crystal displays (LCDs), plasma displays, light-emitting diode (LED) based displays or any known or other type of display device that may be suitable for use in flight deck 12. Display devices 14 may be used to display operational and status information about various systems of aircraft 10, information related to flight/mission planning, maps and any other information that may be useful for the flight crew (e.g., pilots) during the operation of aircraft 10. Display devices 14 may facilitate dialog between the flight crew and various systems of aircraft 10 via suitable graphical user interfaces. Flight deck 12 may comprise one or more data input devices such as, for example, one or more cursor control devices 20, one or more multi-function keypads 22 and one or more (e.g., standalone or multifunction) controllers 23 that may permit data entry by the flight crew. For example, such controller(s) 23 may be disposed in the glare shield above one or more display devices 14.

Aircraft 10 may comprise one or more high-lift flight control surfaces 24 (referred hereinafter as "high-lift devices 24") of aircraft 10. High-lift devices 24 may comprise actuatable aerodynamic surfaces which may serve to increase an amount of lift generated by aircraft 10 during certain phases of operation such as during take-off and landing for example. Depending on the specific configuration of aircraft 10, high-lift devices 24 may comprise one or more trailing edge flaps 24A and/or one or more leading edge slats 24B. High-lift devices 24 may be part of main wings 26 of aircraft 10. Alternatively or in addition, high-lift devices 24 may be located elsewhere on aircraft 10. The systems, devices and methods disclosed herein are not intended to be limited to the specific type and number of high-lift devices 24 shown herein. In various embodiments, the systems, devices and methods disclosed herein may be useful in the operation of a single high-lift device 24 or of a plurality of high-lift devices 24.

Flight deck 12 may comprise lever 28, which may serve to control the operation of one or more high-lift devices 24. Lever 28 may be also known as a "flap lever" even though it may be used to control the operation of both flaps 24A and slats 24B. Lever 28 may be used to receive an input from the flight crew representative of a commanded configuration of high-lift devices 24. Lever 28 may be movable to discrete positions (e.g., 0, 1, 2, 3 and 4) corresponding to particular commanded configurations for flaps 24A and slats 24B. Depending on the type of aircraft 10 and its current phase of operation, the same configuration number may correspond to different position settings in degrees for flaps 24A and/or slats 24B. For example, the same configuration number may correspond to different position settings depending on whether aircraft 10 is about to take-off, about to land and/or performing a steep approach. Even though lever 28 may have discrete positions, high-lift devices 24 may move to attain the respective commanded positions in degrees. High-lift devices 24 may be operated so that the deployment/retraction of high-lift devices 24 is substantially symmetric on both wings 26.

A commanded configuration (e.g., 0, 1, 2, 3 and 4) input via lever 28 may correspond to a commanded position (e.g., in degrees) of flaps 24A and to a commanded position (e.g., in degrees) of slats 24B. Even though the commanded configuration may apply to both flaps 24A and slats 24B, the commanded position of flaps 24A in degrees may not necessarily correspond to the same commanded position of slats 24B in degrees for the same configuration commanded via lever 28.

One or more of display devices 14 may comprise indicator 30 displayed in respective display areas 16 during one or more phases of flight of aircraft 10. In some embodiments, a single instance of indicator 30 may be displayed on a display device 14 that is conveniently located to be visible by both the captain and the first officer. For example, an instance of indicator 30 may be displayed on a display device 14 on which other indications relating to an engine-indicating and crew-alerting system (EICAS) of aircraft 10 may also be displayed. Alternatively, indicator 30 may be displayed on a display device 14 considered a primary flight display (PFD) of flight deck 12. For example, one instance of indicator 30 may be displayed on the captain's PFD and another instance of indicator 30 may be displayed on the first officer's PFD for example. As explained further below, indicator 30 may provide relevant information about the operation of one or more high-lift devices 24 to the flight crew in a clear and integrated manner that is also intuitive and relatively easy to interpret by the flight crew. Indicator 30 may be displayed during approach, landing, take-off and/or climb phases of operation of aircraft 10. In various embodiments, indicator 30 may be temporarily displayed or alternatively may be permanently displayed. In some embodiments, indicator 30 may be selectively displayed based on input from the flight crew.

Figure 2A:
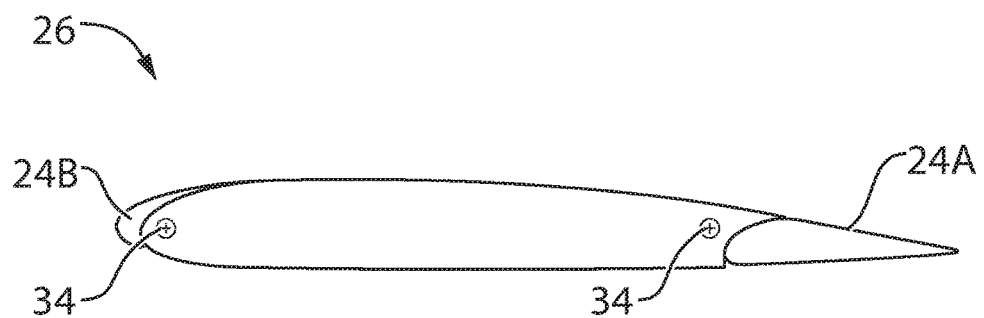
FIGS. 2A and 2B are cross-section views of an exemplary wing of the aircraft of FIG. 1 taken along line 2-2 in FIG. 1 showing high-lift devices in a retracted configuration and a deployed configuration respectively.
Figure 2B:
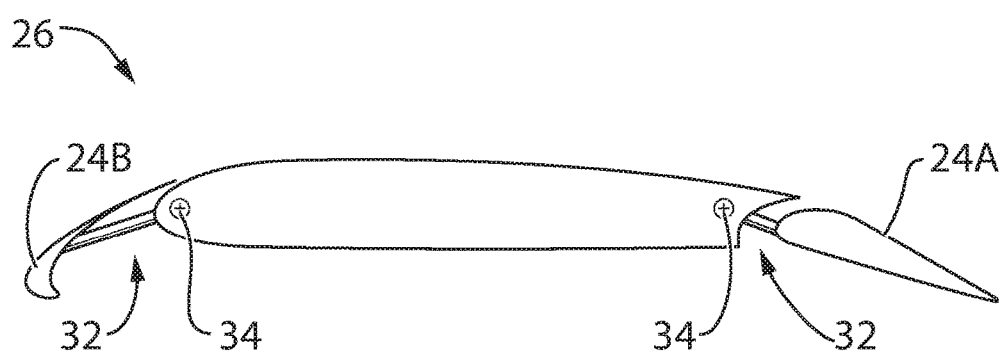

FIGS. 2A and 2B are cross-section views of wing 26 of aircraft 10 taken along line 2-2 in FIG. 1. FIG. 2A shows high-lift devices 24 in a retracted configuration and FIG. 2B shows high-lift devices 24 in a deployed configuration. The retracted and deployed configurations may correspond to two different discrete positions of lever 28. High-lift devices 24 may be actuatable via suitable actuation mechanisms 32 of known or other types. One or more sensors 34 may be used to monitor the deployment/retraction of high-lift devices 24. For example, sensors 34 may comprise position sensors for acquiring measurement(s) representative of actual position(s) (e.g., in degrees) of high-lift device(s) 24.

Figure 3:
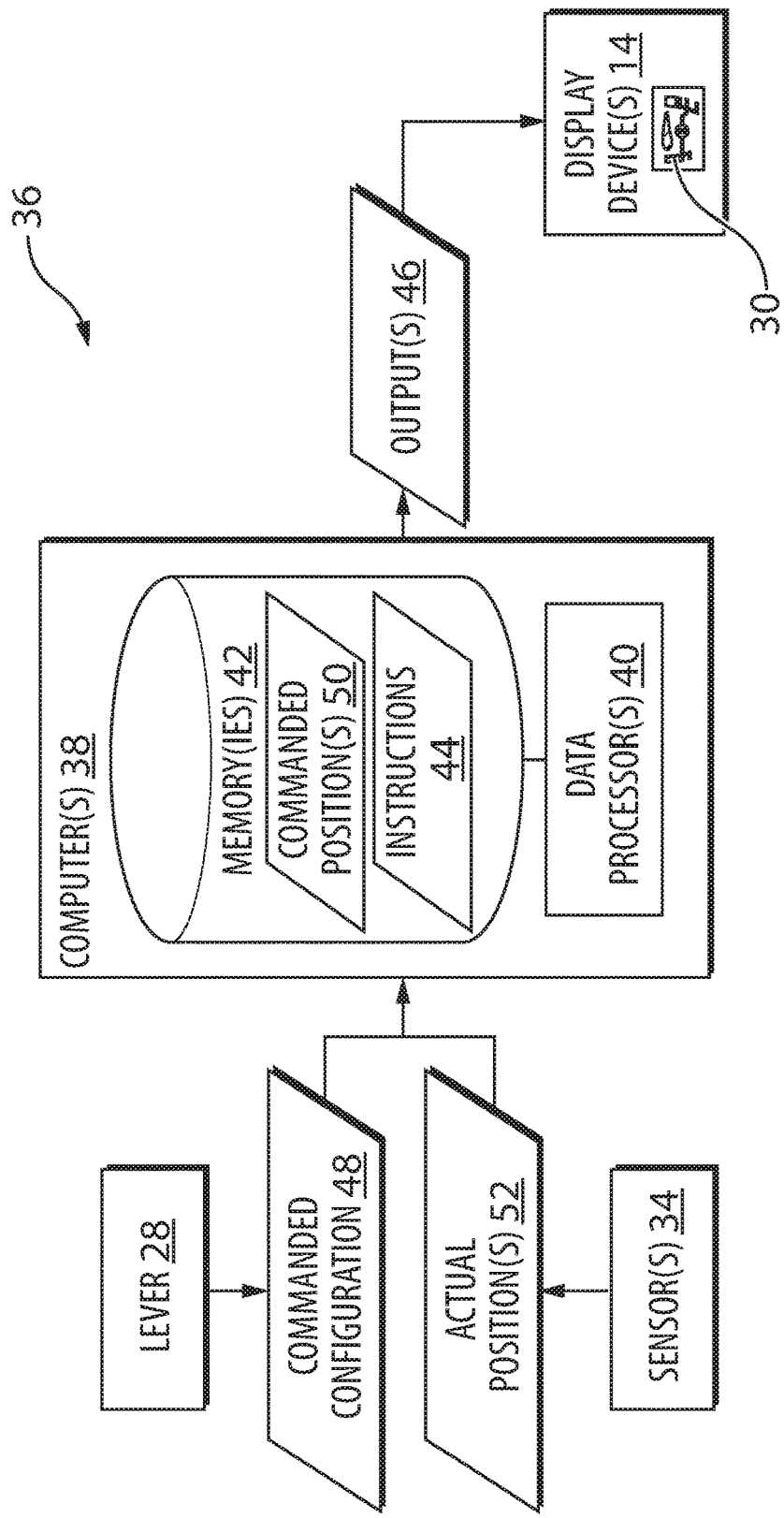
FIG. 3 shows a schematic representation of an exemplary indicating system for one or more of the high-lift devices of the aircraft of FIG. 1.

FIG. 3 shows an exemplary indicating system 36 for one or more high-lift devices 24 of aircraft 10. System 36 may be integrated with flight deck 12. System 36 may comprise one or more computers 38 (referred hereinafter as "computer 38") operatively coupled to display device 14 of flight deck 12. Computer 38 may comprise one or more data processors 40 (referred hereinafter as "data processor 40") and one or more computer-readable memories 42 (referred hereinafter as "memory 42") storing machine-readable instructions 44 executable by data processor 40 and configured to cause data processor 40 to generate one or more outputs 46 (referred hereinafter as "output 46"). Output 46 may comprise one or more signals for causing display device 14 of aircraft 10 to show indicator 30. The configuration of indicator 30 may be based on data representative of a commanded configuration 48 (e.g., position of lever 28) for high-lift device 24 and a corresponding commanded position 50 for high-lift device 24. Commanded position 50 may be determined based on commanded configuration 48 using instructions 44. For example, commanded position 50 may be obtained from a look-up table based on commanded configuration 48. For example, commanded position 50 may be a position in degrees for high-lift device 24 corresponding to a particular commanded configuration 48. Indicator 30 may also indicate data representative of an actual position 52 of high-lift device 24 acquired via sensor(s) 34. The information displayed by indicator 30 may be substantially real-time information about commanded configuration 48, commanded position 50 and actual position 52. Accordingly, indicator 30 may be dynamic so that current (i.e., up-to-date) information may be presented to the flight crew. The information representative of commanded configuration 48, commanded position 50 and actual position 52 may be indicated by indicator 30 substantially simultaneously.

Computer 38 may be part of an avionics suite of aircraft 10. For example, in some embodiments, computer 38 may carry out additional functions than those described herein including the management of one or more graphic user interfaces of flight deck 12 and/or other part(s) of aircraft 10. In various embodiments, computer 38 may comprise more than one computer or data processors where the methods disclosed herein (or parts thereof) could be performed in parts using a plurality of computers or data processors, or, alternatively, be performed entirely using a single computer or data processor. In some embodiments, computer 38 could be physically integrated with (e.g., embedded in) display device 14.

Processor 40 may comprise any suitable device(s) to cause a series of steps to be performed by computer 38 so as to implement a computer-implemented process such that instructions 44, when executed by computer 38 or other programmable apparatus, may cause the functions/acts specified in the methods described herein to be executed. Processor 40 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 42 may comprise any suitable known or other machine-readable storage medium. Memory 42 may comprise non-transitory computer readable storage medium such as, for example, but not limited to, an electronic, magnetic, optical, electromagnetic, infrared, or semiconductor system, apparatus, or device, or any suitable combination of the foregoing. Memory 42 may include a suitable combination of any type of computer memory that is located either internally or externally to computer 38 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 42 may comprise any storage means (e.g. devices) suitable for retrievably storing machine-readable instructions 44 executable by processor 40.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 42) having computer readable program code (e.g., instructions 44) embodied thereon. The computer program product may, for example, be executed by computer 38 to cause the execution of one or more methods disclosed herein in entirety or in part.

Computer program code for carrying out operations for aspects of the present disclosure in accordance with instructions 44 may be written in any combination of one or more programming languages, including an object oriented programming language such as Java, Smalltalk, C++ or the like and conventional procedural programming languages, such as the "C" programming language or other programming languages. Such program code may be executed entirely or in part by computer 38 or other data processing device(s).

In some embodiments, indicating system 36 may comprise data processor 40; and machine-readable memory 42 storing instructions 44 executable by data processor 40 and configured to cause data processor 40 to: using data representative of commanded configuration 48 for high-lift device 24 and data representative of corresponding commanded position 50 for high-lift device 24, generate output 46 for causing display device 14 of aircraft 10 to show indicator 30. Indicator 30 may indicate commanded configuration 48 and corresponding commanded position 50 for high-lift device 24. Indicator 30 may graphically indicate a correlation (e.g., graphical link) between commanded configuration 48 and corresponding commanded position 50 for the high-lift device 24.

FIGS. 4A-4E show exemplary configurations of indicator 30 generated by system 36 for one or more high-lift devices 24 where high-lift device(s) 24 have reached their commanded position(s) 50. Indicator 30 may provide indications in a graphical (e.g., pictorial) manner so as to facilitate the interpretation of the indications provided to the flight crew. The term "graphical" is intended to encompass any non-textual indications such as, for example, pictures, diagrams, curves, segments, carets, connectors, markers, progress bars and colors. The use of graphical indications may also reduce the risk of misinterpretation that may occur with text-based indications that comprise alphabetical characters. In various embodiments as described below, indicator 30 may utilize a graphical language to intuitively indicate a correlation between commanded configuration 48, commanded position(s) 50, and optionally, actual position(s) 52 for one or more high-lift devices 24.

The exemplary configurations of indicator 30 illustrated in the figures is adapted for both flaps 24A and slats 24B, however, it is understood that indicator 30 could be adapted for only flaps 24A or only slats 24B. Indicator 30 may comprise flap region 30A and/or slat region 30B. Flap region 30A and slat region 30B are labelled using the terms "FLAP" and "SLAT" in the figures but other graphical means of indication could be used instead or in addition. For example, image 53 of a wing cross-section could be included in indicator 30 instead of or in addition to the labels. Both regions (e.g., sides) 30A and 30B may comprise functionally equivalent elements. For example: flap region 30A and slat region 30B may respectively comprise analog scales 54A and 54B with optional tick marks; and, flap region 30A and slat region 30B may respectively comprise markers 56A and 56B disposed along the respective analog scales 54A and 54B. Depending on commanded configuration 48 and actual position(s) 52, one or both of regions 30A and 30B may comprise a respective progress bar 58A and 58B (See FIGS. 4B-4E) disposed along the respective analog scales 54A and 54B. The lengths of analog scales 54A and 54B may be proportional to amounts of total deployment (e.g., in degrees) associated with each respective high-lift device 24. Accordingly, in some embodiments analog scale 54A and analog scale 54B may have different lengths.

Figure 4A:
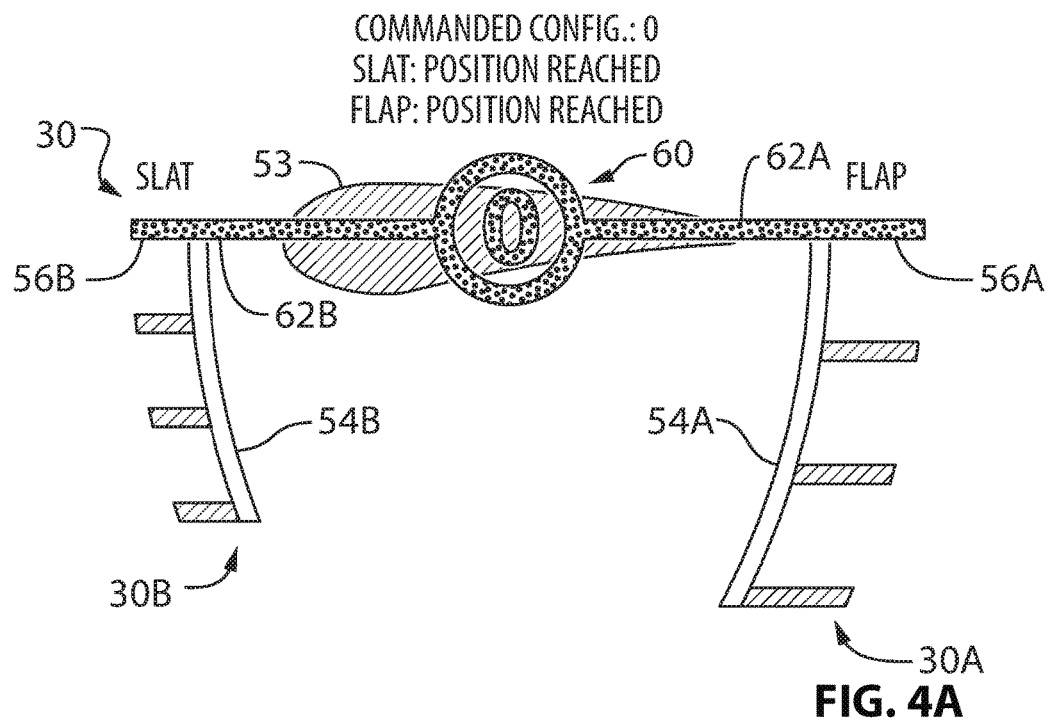
FIGS. 4A-4E show exemplary configurations of an indicator generated by the system of FIG. 3 for one or more of the high-lift devices where the high-lift devices have reached their commanded positions.

Indicator 30 may comprise configuration indication 60 comprising a textual element representing commanded configuration 48 (e.g., configuration number 0, 1, 2, 3 or 4) commanded via lever 28 or other means. In some embodiments, commanded configuration 48 may be entered into system 36 by the flight crew via input means such as cursor control device 20, keypad 22 and controller 23 for example. In some embodiments, commanded configuration 48 could alternatively be provided by an auto-pilot system of aircraft 10. Configuration indication 60 may have a variable position that is dependent on commanded configuration 48. For example, configuration indication 60 may have an uppermost position as shown in FIG. 4A when commanded configuration 48 is equal to zero (0) and subsequent commanded configurations 48 (e.g., 1 to 4) may cause configuration indication 60 to have a progressively lower position on indicator 30 as shown in FIGS. 4B-4E.

Indicator 30 may comprise graphical connectors 62A and 62B extending between configuration indication 60 and respective analog scales 54A and 54B. For example, graphical connector 62A may extend between configuration indication 60 and marker 56A disposed along analog scale 54A. Similarly, graphical connector 62B may extend between configuration indication 60 and marker 56B disposed along analog scale 54B. Graphical connectors 62A and 62B may graphically indicate a correlation between commanded configuration 60 and corresponding commanded positions 50 respectively indicated by markers 56A and 56B disposed along respective analog scales 54A and 54B. Each marker 56A and 56B may be disposed on and/or beside its respective analog scale 54A and 54B so as to indicate commanded position 50 in relation to its respective analog scale 54A and 54B.

Since flap region 30A and slat region 30B have functionally equivalent elements, description provided herein in relation to flap region 30A of indicator 30 may also be applicable to flap region 30B and vice versa. Analog scale 54A may be used to graphically indicate commanded position 50 and also actual position 52 of high-lift device 24. For example, a position at an uppermost extremity of analog scale 54A may be representative of high-lift device 24 being fully retracted and a position at a lowermost extremity of analog scale 54A may be representative of high-lift device 24 being fully deployed. Marker 56A disposed along analog scale 54A may be indicative of an amount of deployment (i.e., commanded position 50) of high-lift device 24 that is being requested via lever 28 or otherwise. Graphical connector 62A extending between marker 56A and configuration indication 60 may provide a graphical correlation between commanded configuration 48 and commanded position 50 indicated by marker 56A. Such graphical correlation may convey relevant information to the flight crew in an intuitive manner that is relatively easy to interpret. The graphical correlation may also provide an indication of the intent of the flight crew with respect to the deployment of high-lift device 24.

Actual position 52 may also be indicated by indicator 30 via progress bar 58A along analog scale 54A. In reference to FIG. 4D for example, progress bar 58A graphically indicates that the flap 24A has been deployed from its fully retracted position to its commanded position 50 as indicated by marker 56A. Progress bar 58A may be disposed on, beside and/or substantially parallel to analog scale 54A to indicate actual position 52 in relation to respective analog scale 54A.

Indicator 30 may also make use of color to graphically communicate information to the flight crew. For example, different elements of indicator 30 such as marker 56A, progress bar 58A and graphical connector 62A may have different colors at different times to communicate different conditions associated with high-lift device 24. Different colors are illustrated using different fill patterns in the figures. In FIGS. 4A-4E, marker 56A, progress bar 58 and graphical connector 62A are shown in a "position reached" color (e.g., green) to indicate that actual position 52 of high-lift device 24 substantially corresponds to commanded position 50 for high-lift device 24. In other words, the "position reached" color may be used to indicate that high-lift device 24 has reached its commanded position 50 indicated by marker 56A. Graphical connector 62A may graphically correlate commanded position 50 and actual position 52 of flap 24A to commanded configuration 48 based on the position of lever 28 for example.

FIG. 4A illustrates a configuration of indicator 30 where commanded configuration 48 is zero (0), corresponding commanded position 50 is fully retracted for both flap 24A and slat 24B, and, actual position 52 of both flap 24A and slat 24B correspond to commanded positions 50 as shown by the lack of progress bars 58A and 58B in FIG. 4A.

Figure 4B:
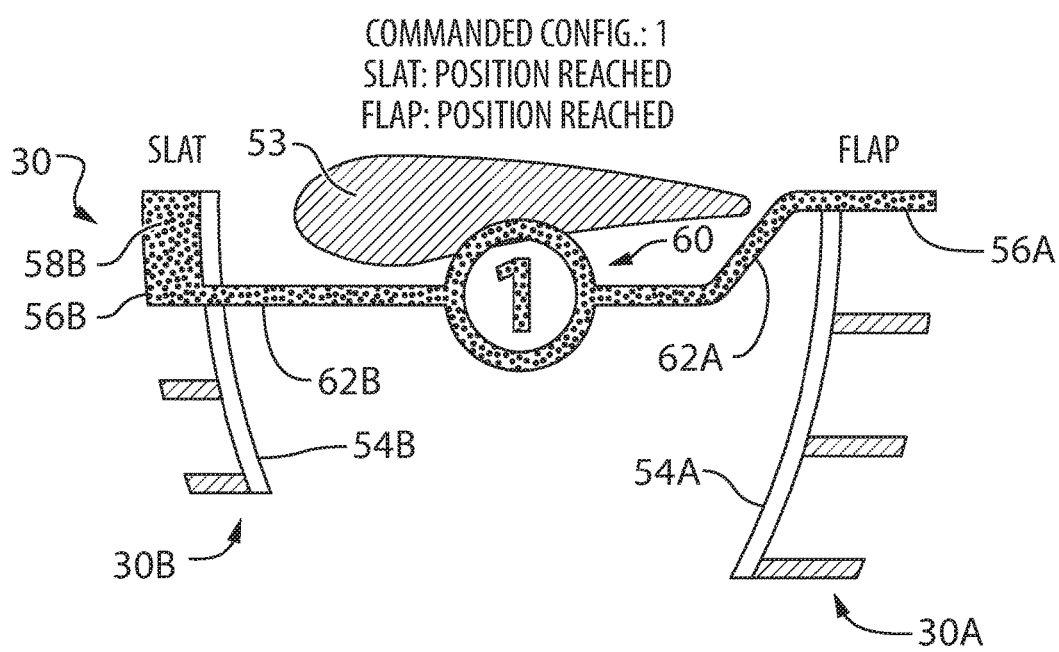

FIG. 4B illustrates a configuration of indicator 30 where commanded configuration 48 is one (1), corresponding commanded position 50 for flap 24A is fully retracted and corresponding commanded position 50 for slat 24B is deployed to marker 56B. Actual position 52 of flap 24A corresponds to commanded position 50 of flap 24A as shown by the lack of progress bar 58A, and, actual position 52 of slat 24B corresponds to commanded position 50 of slat 24B as shown by progress bar 58B and marker 56B.

Figure 4C:
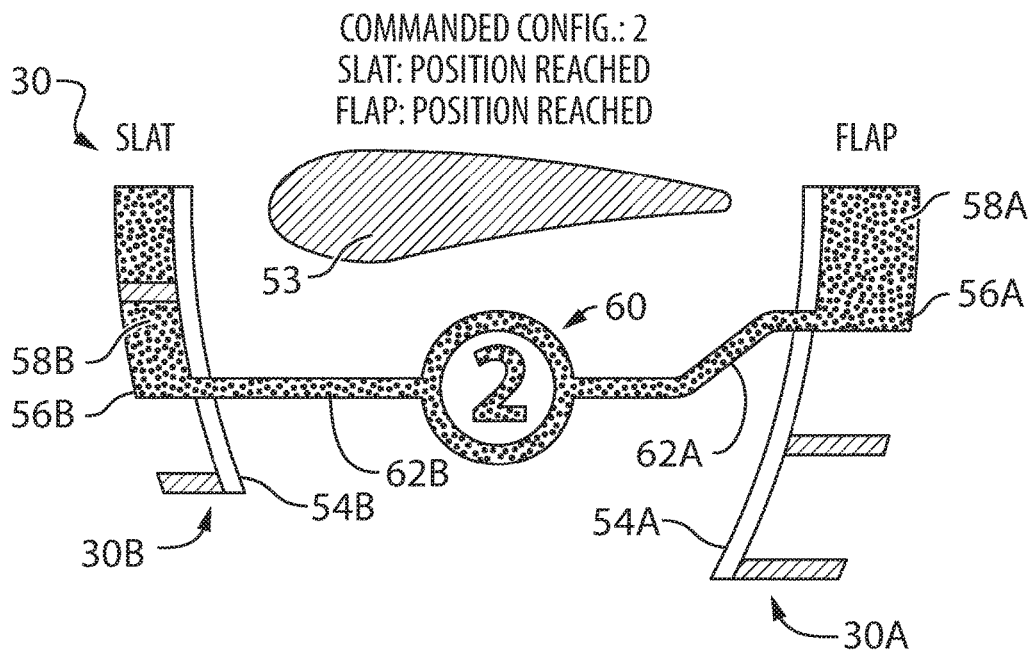

FIG. 4C illustrates a configuration of indicator 30 where commanded configuration 48 is two (2), corresponding commanded position 50 for flap 24A is deployed to marker 56A and corresponding commanded position 50 for slat 24B is deployed to marker 56B. Actual position 52 of flap 24A corresponds to commanded position 50 of flap 24A as shown by progress bar 58A and marker 56A, and, actual position 52 of slat 24B corresponds to commanded position 50 of slat 24B as shown by progress bar 58B and marker 56B.

Figure 4D:
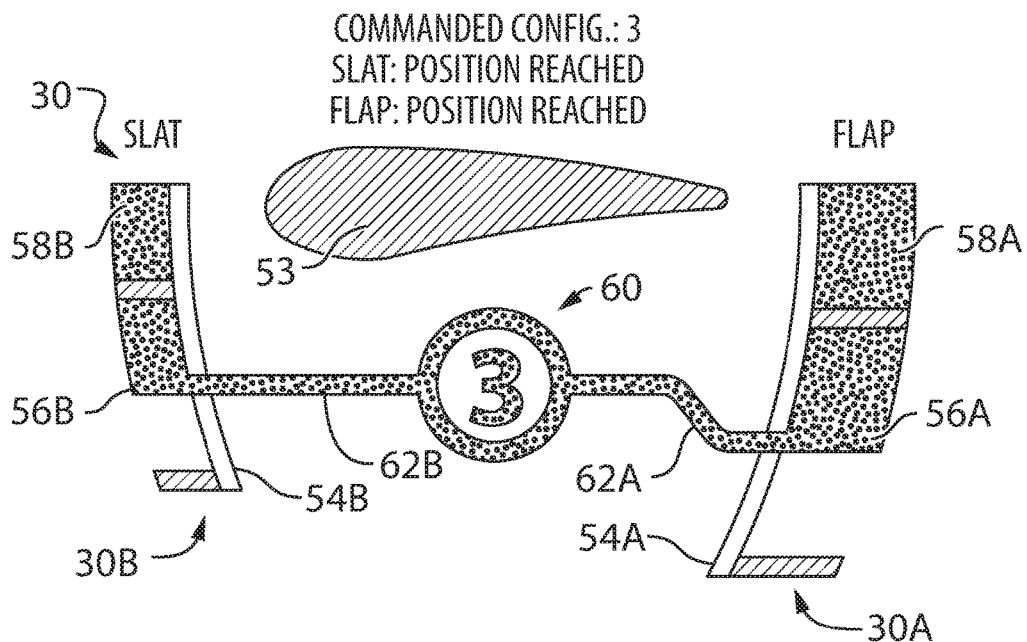

FIG. 4D illustrates a configuration of indicator 30 where commanded configuration 48 is three (3), corresponding commanded position 50 for flap 24A is deployed to marker 56A and corresponding commanded position 50 for slat 24B is deployed to marker 56B. Actual position 52 of flap 24A corresponds to commanded position 50 of flap 24A as shown by progress bar 58A and marker 56A, and, actual position 52 of slat 24B corresponds to commanded position 50 of slat 24B as shown by progress bar 58B and marker 56B.

Figure 4E:
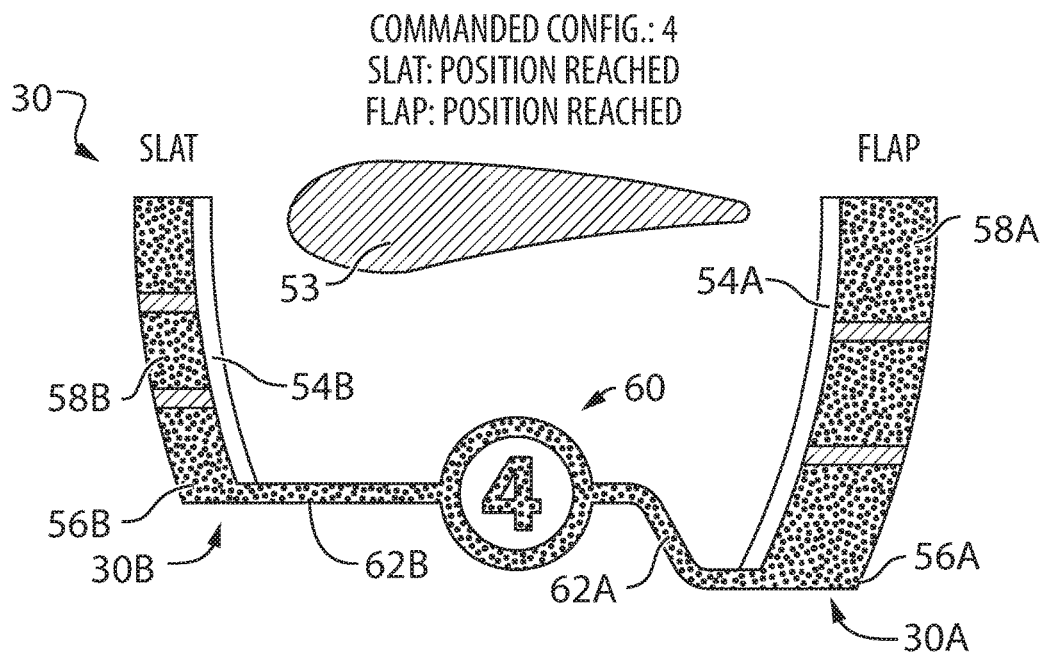

FIG. 4E illustrates a configuration of indicator 30 where commanded configuration 48 is four (4), corresponding commanded position 50 for flap 24A is deployed to marker 56A (i.e., fully deployed) and corresponding commanded position 50 for slat 24B is deployed to marker 56B (i.e., fully deployed). Actual position 52 of flap 24A corresponds to commanded position 50 of flap 24A as shown by progress bar 58A and marker 56A, and, actual position 52 of slat 24B corresponds to commanded position 50 of slat 24B as shown by progress bar 58B and marker 56B.

Figure 5A:
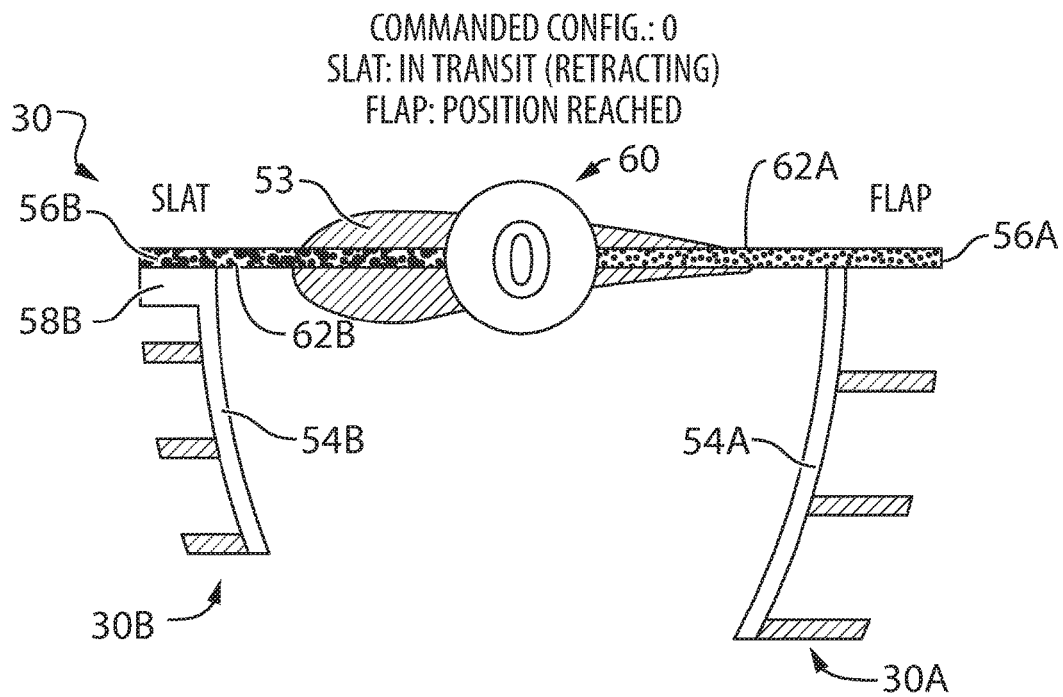
FIGS. 5A-5E show exemplary configurations of the indicator of FIGS. 4A-4E where one or more of the high-lift devices are transitioning toward their commanded positions.

FIGS. 5A-5E show exemplary configurations of indicator 30 where one or more high-lift devices 24 is/are transitioning toward commanded position(s) 50 (i.e., position(s) intended by the flight crew). For example, the configuration of indicator 30 shown in FIG. 5A is indicative of a retraction scenario of slat 24B where commanded position 50 is the fully retracted position but slat 24B is transitioning toward commanded position 50 indicated by marker 56B and by the dynamic shortening of progress bar 58B. When slat 24B is transitioning, the color of marker 56B and graphical connector 62B may be shown in a "pilot intent" color (e.g., cyan). When slat 24B is transitioning, the color of progress bar 58B may be shown in an "in transit" color (e.g., white). In various embodiments, the "pilot intent" color of marker 56B and graphical connector 62B and "in transit" color of progress bar 58B may be the same or different as shown in FIGS. 5A-5E. In FIG. 5A, commanded configuration 48 is zero (0) where corresponding commanded position 50 for flap 24A is fully retracted and corresponding commanded position 50 for slat 24B is also fully retracted. Actual position 52 of flap 24A corresponds to commanded position 50 of flap 24A as shown by the lack of progress bar 58A and also by marker 56A and graphical connector 62A being shown in the "position reached" color.

Figure 5B:
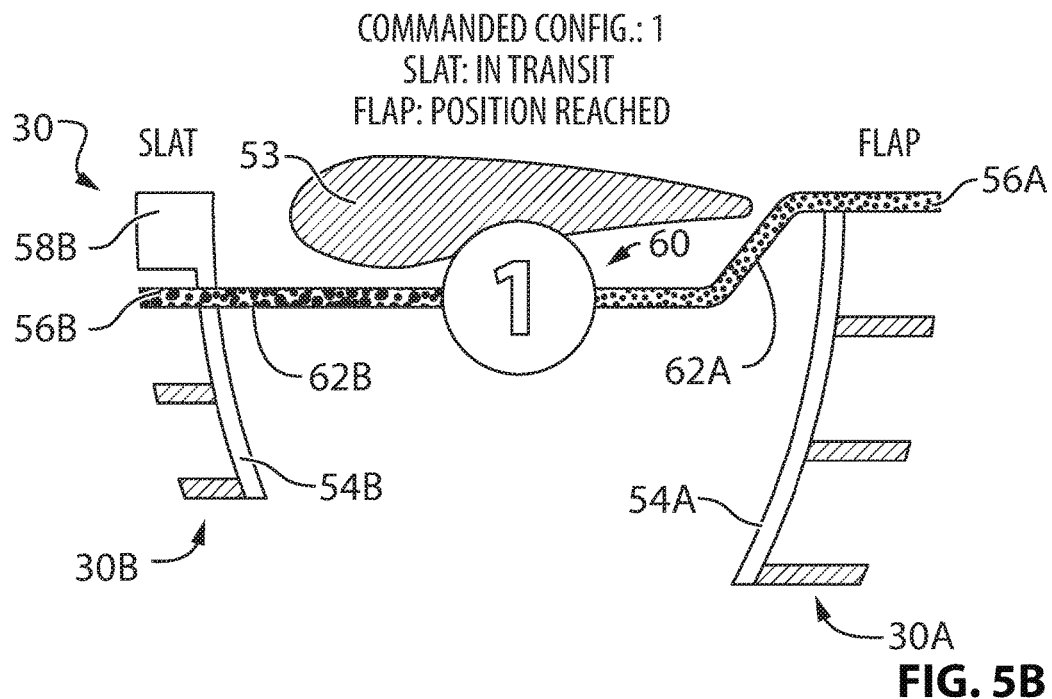

FIG. 5B illustrates a configuration of indicator 30 where commanded configuration 48 is one (1), corresponding commanded position 50 for flap 24A is fully retracted and corresponding commanded position 50 for slat 24B is deployed to marker 56B. Actual position 52 of flap 24A corresponds to commanded position 50 of flap 24A as shown by the lack of progress bar 58A, and, slat 24B is shown to be transitioning toward commanded position 50 of slat 24B as shown by progress bar 58B dynamically extending (e.g., in real time) toward marker 56B and being shown in its "in transit" color while marker 56B and graphical connector 62B are also shown in their "pilot intent" color.

Figure 5C:
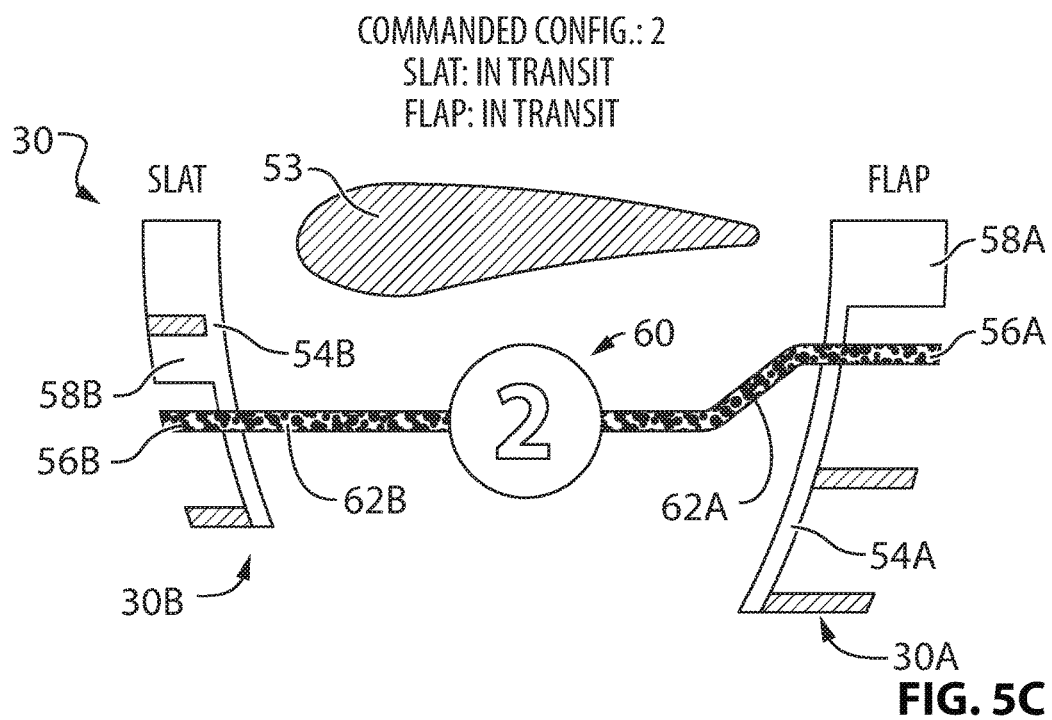

FIG. 5C illustrates a configuration of indicator 30 where commanded configuration 48 is two (2), corresponding commanded position 50 for flap 24A is deployed to marker 56A and corresponding commanded position 50 for slat 24B is deployed to marker 56B. Flap 24A is shown to be transitioning toward commanded position 50 of flap 24A as shown by progress bar 58A dynamically extending toward marker 56A and being shown in its "in transit" color while marker 56A and graphical connector 62A are also shown in their "pilot intent" color. Slat 24B is shown to be transitioning toward commanded position 50 of slat 24B as shown by progress bar 58B dynamically extending toward marker 56B and being shown in its "in transit" color while marker 56B and graphical connector 62B are also shown in their "pilot intent" color.

Figure 5D:
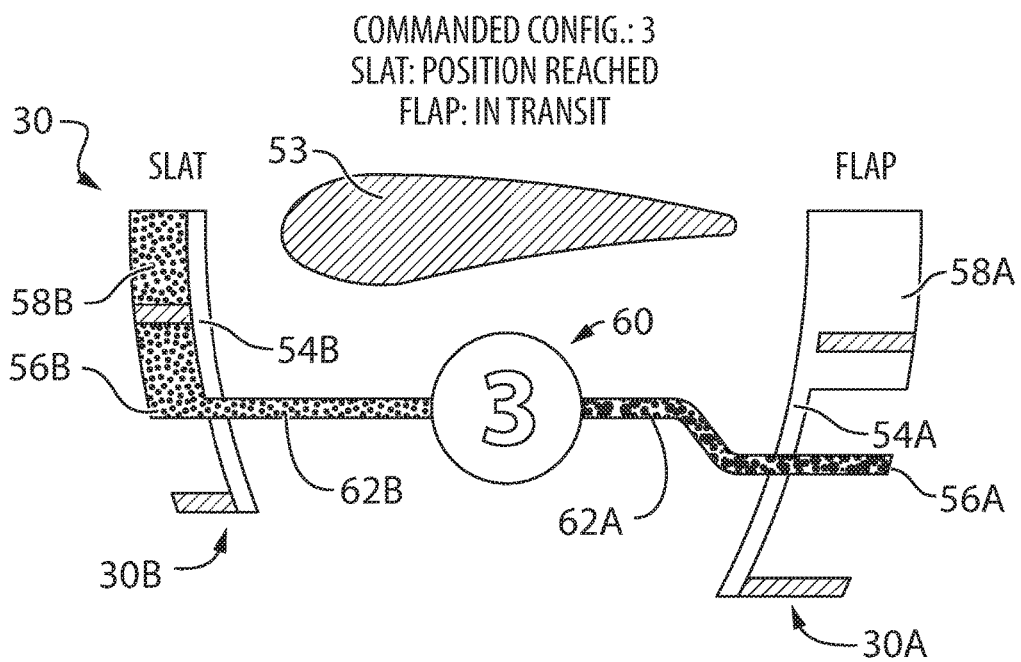

FIG. 5D illustrates a configuration of indicator 30 where commanded configuration 48 is three (3), corresponding commanded position 50 for flap 24A is deployed to marker 56A and corresponding commanded position 50 for slat 24B is deployed to marker 56B. Flap 24A is shown to be transitioning toward commanded position 50 of flap 24A as shown by progress bar 58A dynamically extending toward marker 56A and being shown in its "in transit" color while marker 56A and graphical connector 62A are shown in their "pilot intent" color. Slat 24B is shown to having reached commanded position 50 of slat 24B as shown by progress bar 58B being shown in its "position reached" color while marker 56B and graphical connector 62B are also shown in their "position reached" color.

Figure 5E:
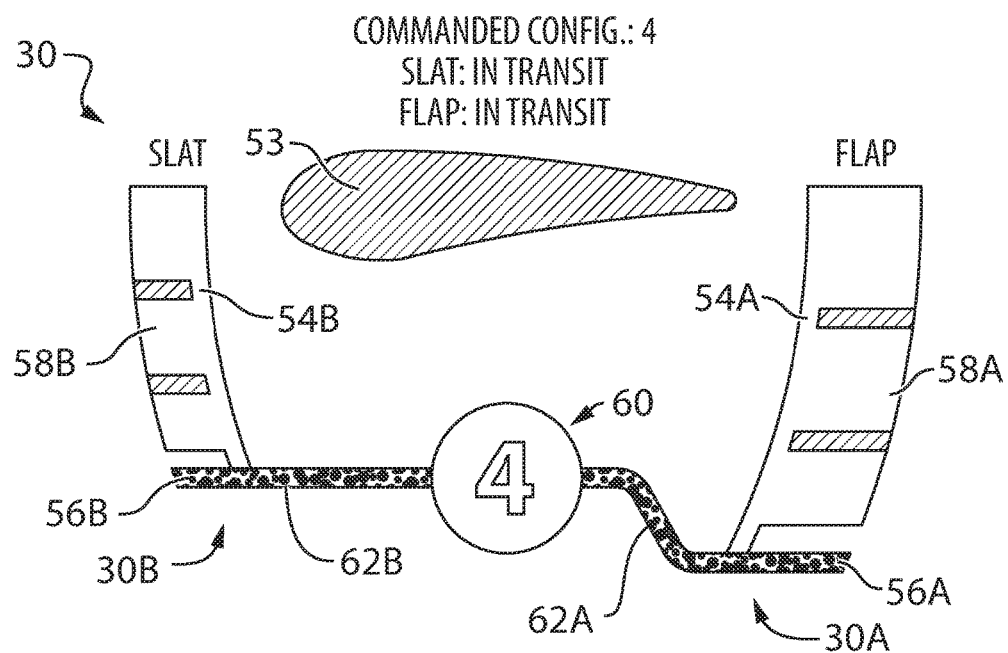

FIG. 5E illustrates a configuration of indicator 30 where commanded configuration 48 is four (4), corresponding commanded position 50 for flap 24A is deployed to marker 56A (i.e., fully deployed) and corresponding commanded position 50 for slat 24B is deployed to marker 56B (i.e., fully deployed). Flap 24A is shown to be transitioning toward commanded position 50 of flap 24A as shown by progress bar 58A dynamically extending toward marker 56A and being shown in its "in transit" color while marker 56A and graphical connector 62A are also shown in their "pilot intent" color. Slat 24B is shown to be transitioning toward commanded position 50 of slat 24B as shown by progress bar 58B dynamically extending toward marker 56B and being shown in its "in transit" color while marker 56B and graphical connector 62B are also shown in their "pilot intent" color.

Figure 6A:
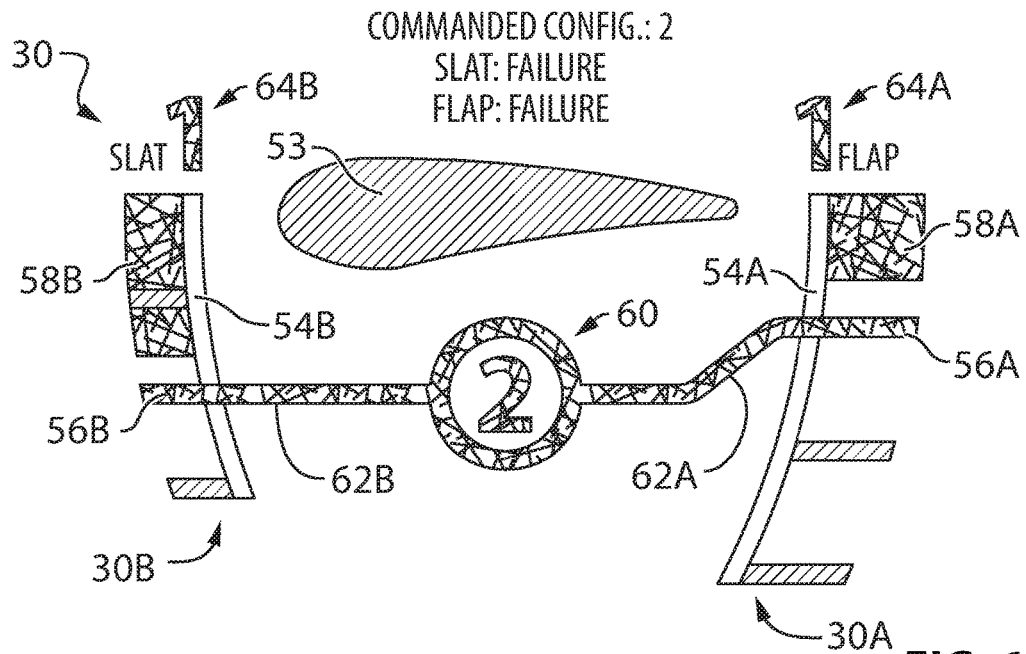
FIGS. 6A-6B show exemplary configurations of the indicator of FIGS. 4A-4E where one or more of the high-lift devices have failed to reach their commanded positions.
Figure 6B:
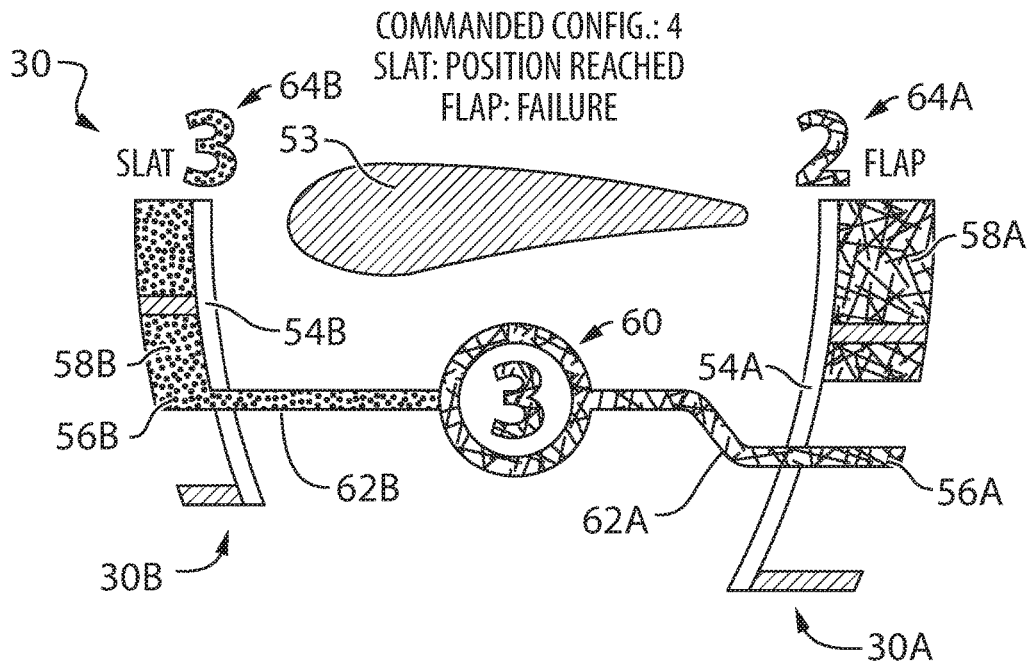

FIGS. 6A-6B show exemplary configurations of indicator 30 where one or more high-lift devices 24 have failed to reach their commanded positions 50. For example, the configuration of indicator 30 shown in FIG. 6A is indicative of a situation where commanded configuration 48 is two (2), corresponding commanded position 50 for flap 24A is deployed to marker 56A and corresponding commanded position 50 for slat 24B is deployed to marker 56B. However, due to some system degradation or failure, both flap 24A and slat 24B have failed to reach their respective commanded positions 50. The situation illustrated in FIG. 6A may be indicative of a jam of both flap 24A and slat 24B. In such situation, one or more elements of indicator 30 may be shown in a "failure" color (e.g., yellow). For example, markers 56A, 56B, graphical connectors 62A, 62B and progress bars 58A, 58B may be shown in their "failure" color when appropriate. The presence of a failure may be determined by computer 38 via instructions 44 by determining that high-lift device 24 has failed to reach its commanded position 50 within a predetermined time threshold. Alternatively or in addition, the presence of a failure may be determined based on system health monitoring data that may be received at computer 38. The "failure" color may be indicative of the type of event or condition that is associated with the degradation or failure. For example, a "failure" color may be associated with a level of alert. For example a "failure" color of red may be associated with a higher level of alert than a "failure" color of yellow.

In some embodiments, indicator 30 may also comprise actual configuration indicators 64A, 64B indicating the actual configuration reached by flap 24A and slat 24B respectively. In the case of failure, such indication may inform the flight crew of the last achieved configuration of high-lift device(s) 24 and may be indicative of landing performance of aircraft 10. Accordingly, in case of a failure affecting the deployment and/or retraction of high-lift device 24, indicator 30 may provide a clear overview of: (1) the actual (i.e., current) position 52 of high-lift device 24; (2) what was commanded configuration 48 (i.e., pilot intent); and (3) what is the delta between actual position 52 and commanded position 50 as indicated by the gap between progress bar 58A and marker 56A.

FIG. 6B illustrates a configuration of indicator 30 where commanded configuration 48 is three (3), corresponding commanded position 50 for flap 24A is deployed to marker 56A and corresponding commanded position 50 for slat 24B is deployed to marker 56B. Due to some system degradation or failure, flap 24A has failed to reach its commanded positions 50 as illustrated by progress bar 58A, marker 56A and graphical connector 62A being shown in their "failure" color. Actual position 52 of slat 24B corresponds to commanded position 50 of slat 24B as illustrated by progress bar 58B, marker 56B and graphical connector 62B being shown in their "position reached" color.

The amount of deployment of high-lift device 24 may depend on the phase of operation of aircraft 10. For example, in the case of a steep approach, high-lift device 24 may be permitted to be deployed by a greater amount than during a regular approach or a take-off for example. Accordingly, the lengths of analog scales 54A, 54B may vary depending on the specific situation. For example, indicator 30 shown in FIG. 6A may represent a situation where flap 24A may be deployed by a greater amount than in the situation represented by indicator 30 in FIG. 6B because analog scale 54A in FIG. 6A is longer than analog scale 54A in FIG. 6B.

Figure 7:
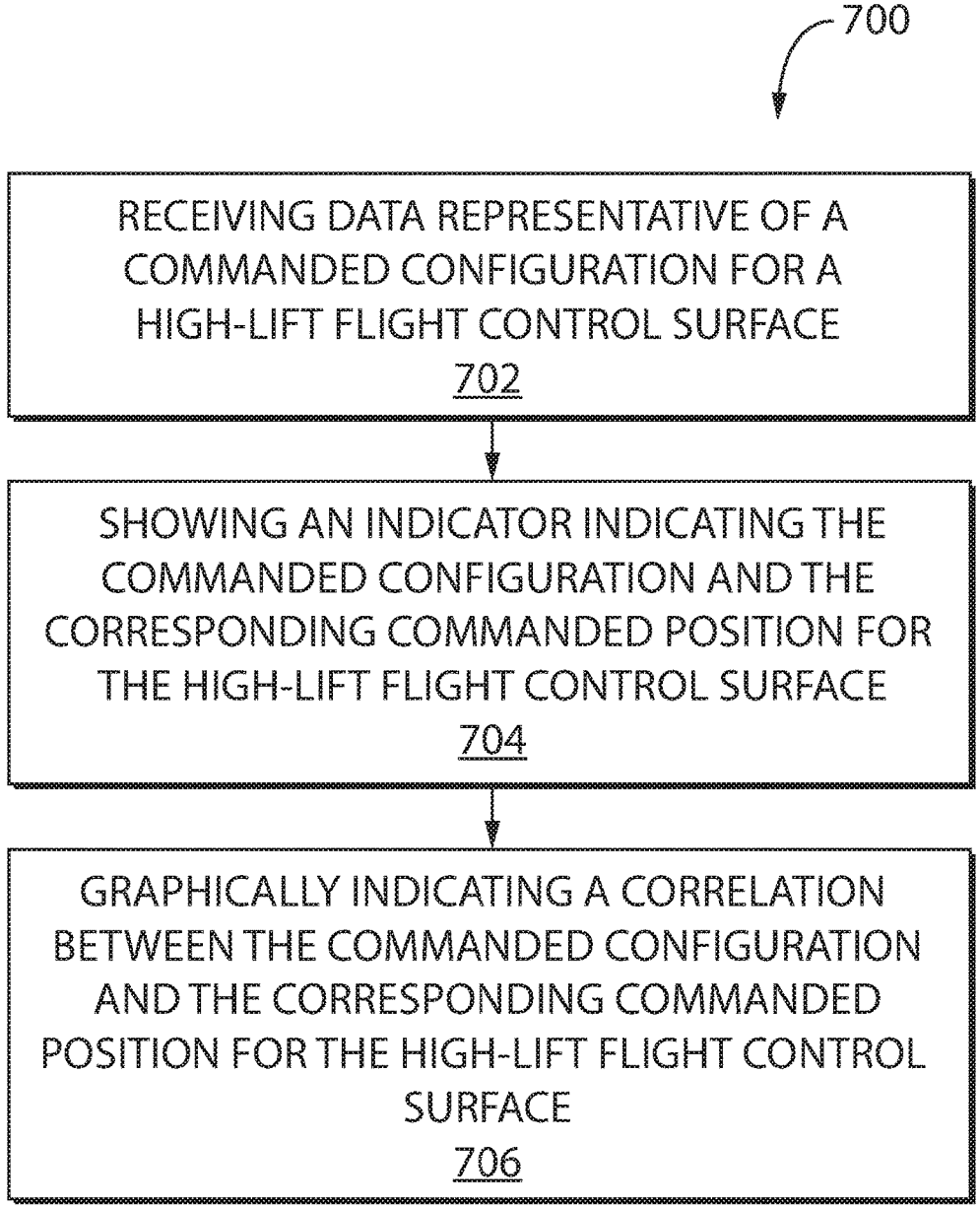
FIG. 7 is a flowchart illustrating an exemplary method for use with one or more high-lift devices.

FIG. 7 is a flowchart illustrating an exemplary method 700 for use with one or more high-lift devices 24. Method 700 may be executed in entirety or in part using indicating system 36 based on machine-readable instructions 44. Method 700 or part(s) thereof may be combined with other methods or steps disclosed herein. Method 700 may comprise: receiving data representative of commanded configuration 48 for high-lift device 24 (see block 702); and on display device 14 of aircraft 10, showing indicator 30 indicating commanded configuration 48 and corresponding commanded position 50 for high-lift flight device 24 (see block 704). Method 700 may also comprise graphically indicating a correlation (e.g., graphical connector 62A and/or 62B) between commanded configuration 48 and corresponding commanded position 50 for high-lift device 24

(see block 706). Commanded position 50 may be indicated using analog scale 54A and/or 54B via marker 56A and/or 56B for example.

As explained above, commanded configuration 48 may correspond to a high-lift configuration number (e.g., 0, 1, 2, 3 or 4), which may correspond to a discrete position of lever 28.

Method 700 may comprise receiving data representative of actual position 52 of high-lift device 24 and causing indicator 30 to indicate actual position 52 of high-lift device 24. Actual position 52 may be indicated using analog scale 54A and/or 54B via progress bar 58A and/or 58B for example.

Graphical connector 62A and/or 62B may comprise: a first (i.e., "position reached") color when actual position 52 of high-lift device 24 substantially corresponds to commanded position 50 for high-lift device 24; a second (i.e., "pilot intent") color when actual position 52 of high-lift device 24 is transitioning toward commanded position 50 for high-lift device 24; and, a third (i.e., "failure") color when actual position 52 of high-lift device 24 has failed to reach commanded position 50 for high-lift device 24.

Progress bar 58A and/or 58B may comprise: a first (i.e., "position reached") color when actual position 52 of high-lift device 24 substantially corresponds to commanded position 50 for high-lift device 24; a second (i.e., "in transit") color when actual position 52 of high-lift device 24 is transitioning toward commanded position 50 for high-lift device 24; and, a third (i.e., "failure") color when actual position 52 of high-lift device 24 has failed to reach commanded position 50 for high-lift device 24.

Marker 56A and/or 56B may comprise: a first (i.e., "position reached") color when actual position 52 of high-lift device 24 substantially corresponds to commanded position 50 for high-lift device 24; a second (i.e., "pilot intent") color when actual position 52 of high-lift device 24 is transitioning toward commanded position 50 for high-lift device 24; and, a third (i.e., "failure") color when actual position 52 of high-lift device 24 has failed to reach commanded position 50 for high-lift device 24.

Method 700 may be used in conjunction with one or more high-lift devices 24 and also with one or more types of high-lift devices 24. In other words, method 700 and indicator 30 may be used with flaps 24A or slats 24B, or, with both flaps 24A and slats 24B. Also, separate indicators 30 may be used for high-lift devices 24 of different wings 26 to permit the indication of asymmetry between high-lift devices 24 of the different wings 26.

Method 700 may comprise showing the indicated commanded configuration 60 in the form of a textual element representing commanded configuration 48. As explained above, such textual element may have a variable position that is dependent on commanded configuration 48.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, while the systems, devices and methods disclosed and shown herein may comprise a specific number of elements/components, the systems, devices and methods could be modified to include additional or fewer of such elements/components.

The present disclosure is also intended to cover and embrace all suitable changes in technology. Modifications which fall within the scope of the present invention will be apparent to those skilled in the art, in light of a review of this disclosure, and such modifications are intended to fall within the appended claims. The scope of the claims should not be limited by the preferred embodiments set forth in the examples, but should be given the broadest interpretation consistent with the description as a whole.

What is claimed is:

1. An indicating system for one or more high-lift flight control surfaces of an aircraft, the system comprising:
a data processor; and
non-transitory machine-readable memory storing instructions executable by the processor and configured to cause the processor to:
using data representative of a commanded configuration for a high-lift flight control surface and data representative of a corresponding commanded position for the high-lift flight control surface, generate an output for causing a display device of the aircraft to show an indicator indicating the commanded configuration and the corresponding commanded position for the high-lift flight control surface, the indicator graphically indicating a correlation between the commanded configuration and the corresponding commanded position for the high-lift flight control surface.

2. The indicating system as defined in claim 1, wherein the commanded configuration corresponds to a high-lift configuration number.

3. The indicating system as defined in claim 1, wherein the commanded configuration corresponds to a position of a lever.

4. The indicating system as defined in claim 1, wherein the instructions are configured to cause the processor to, using data representative of an actual position of the high-lift flight control surface, generate the output for causing the indicator to indicate the actual position of the high-lift flight control surface.

5. The indicating system as defined in claim 1, wherein the commanded position is indicated using an analog scale.

6. The indicating system as defined in claim 5, wherein the instructions are configured to cause the processor to, using data representative of an actual position of the high-lift flight control surface, generate the output for causing the indicator to indicate the actual position of the high-lift flight control surface.

7. The indicating system as defined in claim 6, wherein the actual position is indicated using the analog scale.

8. The indicating system as defined in claim 7, wherein the actual position is indicated using a progress bar along the analog scale.

9. The indicating system as defined in claim 5, wherein the commanded position is indicated using a marker along the analog scale.

10. The indicating system as defined in claim 1, wherein the indicator comprises a graphical connector between the indicated commanded configuration and the indicated commanded position for the high-lift flight control surface to indicate the correlation between the commanded configuration and the commanded position for the high-lift flight control surface.

11. The indicating system as defined in claim 10, wherein the graphical connector comprises: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

12. The indicating system as defined in claim 8, wherein the progress bar comprises: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

13. The indicating system as defined in claim 9, wherein the marker comprises: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

14. The indicating system as defined in claim 1, wherein the instructions are configured to cause the processor to:
using data representative of a corresponding commanded position for another high-lift flight control surface, generate the output for causing the indicator to indicate the corresponding commanded position for the other high-lift flight control surface, the indicator graphically indicating another correlation between the commanded configuration and the corresponding commanded position for the other high-lift flight control surface.

15. The indicating system as defined in claim 14, wherein the instructions are configured to cause the processor to, using data representative of an actual position of the other high-lift flight control surface, generate the output for causing the indicator to indicate the actual position of the other high-lift flight control surface.

16. The indicating system as defined in claim 1, wherein the indicated commanded configuration comprises a textual element representing the commanded configuration, the textual element having a variable position that is dependent on the commanded configuration.

17. A display device for one or more high-lift flight control surfaces of an aircraft, the display device comprising:
a display area; and
an indicator shown in the display area, the indicator indicating a commanded configuration for a high-lift flight control surface and a corresponding commanded position for the high-lift flight control surface, the indicator graphically indicating a correlation between the commanded configuration and the corresponding commanded position for the high-lift flight control surface.

18. The display device as defined in claim 17, wherein the commanded configuration corresponds to a high-lift configuration number.

19. The display device as defined in claim 17, wherein the commanded configuration corresponds to a position of a lever.

20. The display device as defined in claim 17, wherein the indicator indicates the actual position of the high-lift flight control surface.

21. The display device as defined in claim 17, wherein the commanded position is indicated using an analog scale.

22. The display device as defined in claim 21, wherein the indicator indicates the actual position of the high-lift flight control surface.

23. The display device as defined in claim 22, wherein the actual position is indicated using the analog scale.

24. The display device as defined in claim 23, wherein the actual position is indicated using a progress bar along the analog scale.

25. The display device as defined in claim 21, wherein the commanded position is indicated using a marker along the analog scale.

26. The display device as defined in claim 17, wherein the indicator comprises a graphical connector between the indicated commanded configuration and the indicated commanded position for the high-lift flight control surface to indicate the correlation between the commanded configuration and the commanded position for the high-lift flight control surface.

27. The display device as defined in claim 26, wherein the graphical connector comprises: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

28. The display device as defined in claim 24, wherein the progress bar comprises: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

29. The display device as defined in claim 25, wherein the marker comprises: a first color when the actual position of the high-lift flight control surface substantially corresponds to the commanded position for the high-lift flight control surface; a second color when the actual position of the high-lift flight control surface is transitioning toward the commanded position for the high-lift flight control surface; and a third color when the actual position of the high-lift flight control surface has failed to reach the commanded position for the high-lift flight control surface.

30. The display device as defined in claim 17, wherein the indicator indicates a corresponding commanded position for another high-lift flight control surface, the indicator graphically indicating a correlation between the commanded configuration and the corresponding commanded position for the other high-lift flight control surface.

31. The display device as defined in claim 30, wherein the indicator indicates an actual position of the other high-lift flight control surface.

32. The display device as defined in claim 17, wherein the indicated commanded configuration comprises a textual element representing the commanded configuration, the textual element having a variable position that is dependent on the commanded configuration.

33. A method for use with one or more high-lift flight control surfaces of an aircraft, the method comprising:
   receiving data representative of a commanded configuration for a high-lift flight control surface; and
   on a display device of the aircraft, showing an indicator indicating the commanded configuration and a corresponding commanded position for the high-lift flight control surface, the indicator graphically indicating a correlation between the commanded configuration and the corresponding commanded position for the high-lift flight control surface.

* * * * *